United States Patent
Crockett et al.

(10) Patent No.: US 11,271,660 B2
(45) Date of Patent: Mar. 8, 2022

(54) METHOD AND SYSTEM FOR SAMPLING AND DENOISING AMPLIFICATION OF A SIGNAL

(71) Applicant: INSTITUT NATIONAL DE LA RECHERCHE SCIENTIFIQUE (INRS), Quebec (CA)

(72) Inventors: Benjamin Crockett, Saint-Mathieu-de-Beloeil (CA); Jose Azana, Montreal (CA); Luis Romero Cortes, Aljaraque Huelva (ES)

(73) Assignee: Institut national de la recherche scientifique, Quebec (CA)

( * ) Notice: Subject to any disclaimer, the term of this patent is extended or adjusted under 35 U.S.C. 154(b) by 0 days.

(21) Appl. No.: 17/055,143

(22) PCT Filed: May 17, 2019

(86) PCT No.: PCT/IB2019/054102
§ 371 (c)(1),
(2) Date: Nov. 13, 2020

(87) PCT Pub. No.: WO2019/220410
PCT Pub. Date: Nov. 21, 2019

(65) Prior Publication Data
US 2021/0226709 A1     Jul. 22, 2021

Related U.S. Application Data

(60) Provisional application No. 62/672,779, filed on May 17, 2018.

(51) Int. Cl.
*H04B 10/67* (2013.01)
*H04B 10/516* (2013.01)

(52) U.S. Cl.
CPC ..... *H04B 10/676* (2013.01); *H04B 2210/516* (2013.01)

(58) Field of Classification Search
CPC .. H04B 10/676; H04B 2210/516; A61B 6/00; G01N 23/04; G03F 7/20; H04N 5/217; H04N 5/357
USPC .......................................................... 398/208
See application file for complete search history.

(56) References Cited

U.S. PATENT DOCUMENTS

| | | | | |
|---|---|---|---|---|
| 5,801,555 A | * | 9/1998 | Kwon | H04N 5/372 327/94 |
| 7,609,382 B2 | * | 10/2009 | Kastella | H04B 10/70 356/36 |
| 8,570,881 B2 | * | 10/2013 | Talbot | H04L 7/0337 370/252 |

(Continued)

*Primary Examiner* — Abbas H Alagheband
(74) *Attorney, Agent, or Firm* — Fasken Martineau Dumoulin LLP; Serge Lapointe

(57) ABSTRACT

There is described a system for lossless sampling and denoising amplification of a signal, comprising: a first phase modulator configured for receiving a wave signal and modulating a phase of the wave signal while satisfying a Talbot condition to obtain a sampled signal; and a second phase modulator configured for receiving the sampled signal, compensating for a given phase induced in the sampled signal by the first phase modulator while satisfying the Talbot condition to obtain a denoised and amplified signal, and outputting the denoised and amplified signal.

14 Claims, 8 Drawing Sheets

(56) References Cited

U.S. PATENT DOCUMENTS

| | | | | |
|---|---|---|---|---|
| 8,610,995 | B2* | 12/2013 | Bergh | G01C 19/726 |
| | | | | 359/279 |
| 9,544,125 | B2* | 1/2017 | Mao | H04L 5/1461 |
| 11,140,018 | B2* | 10/2021 | Lee | H04L 27/34 |
| 2002/0182257 | A1* | 12/2002 | Shih | G03F 7/70375 |
| | | | | 424/489 |
| 2007/0076290 | A1* | 4/2007 | Hendriks | G11B 7/1369 |
| | | | | 359/315 |
| 2010/0246765 | A1* | 9/2010 | Murakoshi | G01N 23/041 |
| | | | | 378/62 |
| 2012/0163537 | A1* | 6/2012 | Iwakiri | A61B 6/502 |
| | | | | 378/62 |
| 2012/0268717 | A1* | 10/2012 | Zhou | G01J 9/00 |
| | | | | 351/221 |
| 2014/0328222 | A1* | 11/2014 | Mao | H04B 1/525 |
| | | | | 370/278 |
| 2015/0023465 | A1* | 1/2015 | Sato | G01N 23/20075 |
| | | | | 378/36 |
| 2015/0312495 | A1* | 10/2015 | Pan | G06T 5/002 |
| | | | | 348/241 |
| 2019/0159742 | A1* | 5/2019 | Behling | A61B 6/484 |
| 2019/0219713 | A1* | 7/2019 | Steadman Booker | |
| | | | | G01T 1/2018 |

* cited by examiner

METHOD AND SYSTEM FOR SAMPLING AND DENOISING AMPLIFICATION OF A SIGNAL

CROSS REFERENCE TO RELATED APPLICATIONS

The present application is a U.S. National Phase Application pursuant to 35 U.S.C § 371 of International Application No. PCT/IB2019/054102 filed May 17, 2019, which claims priority to U.S. Provisional Patent Application No. 62/672,779 filed May 17, 2018. The entire disclosure contents of these applications are herewith incorporated by reference into the present application.

TECHNICAL FIELD

The present invention relates to the field of signal processing, and more particularly to methods and systems for sampling and/or denoising a signal.

BACKGROUND

Extracting a useful waveform or signal from a noisy background may be challenging, particularly when the signal of interest is entirely buried under noise, thereby preventing a direct detection approach. Random noise is a fundamental limiting factor in the detection of any physical event, so that the problem of noise mitigation is ubiquitous across a wide range of scientific and technological fields, including spectroscopy, radio-astronomy, sensing, telecommunications, data processing etc.

From a signal processing point of view, noise with frequency components located within the frequency bandwidth of the signal under test (so-called in-band noise) is particularly difficult to deal with. The methods for in-band noise mitigation are very limited. Furthermore, concerning out-of-band noise, conventional band pass filtering techniques require priory knowledge of the bandwidth and central frequency of the signal.

The problem of noise in signal detection becomes particularly damaging when the signals of interest are weak, i.e., when their energy content is low. In this context, a key signal processing solution is that of wave amplification. Conventional (active) amplification of signals, where the intensity of a wave is increased by injecting additional energy from an external source, fails to properly amplify a noisy signal since the background noise is amplified as much as the signal of interest. Furthermore, such processes inherently and unavoidably introduce external noise contributions. For instance, conventional active amplification methods for optical signals lead to amplified spontaneous emission (ASE) noise, which consequently decreases the signal to noise ratio (SNR) of the measurement. Therefore, it is very difficult to successfully amplify a weak signal without deteriorating its SNR through an active process. In particular, it is virtually impossible to actively amplify a weak signal which is originally buried under the noise floor. Passive amplification methods, where only the coherent components of a signal under test are amplified, leaving its incoherent noise content unaltered, have been suggested in both the temporal and spectral domains, but they are either limited to repetitive waveforms or offer only modest amounts of amplification, insufficient to show any noise mitigation capabilities.

Therefore, there is a need for an improved method and system for denoising a wave signal.

SUMMARY

According to a first broad aspect, there is provided a system for sampling a signal, comprising: a first phase modulator configured for receiving a wave signal and modulating a phase of the wave signal while satisfying a Talbot condition to obtain a sampled signal; and a second phase modulator configured for receiving the sampled signal, compensating for a given phase induced in the sampled signal by the first phase modulator while satisfying the Talbot condition to obtain a denoised and amplified sampled signal, and outputting the denoised and amplified sampled signal.

In one embodiment, the first phase modulator comprises a frequency phase modulator for modulating a frequency phase of the wave signal while satisfying the Talbot condition to obtain the sampled signal, the sampled signal having an induced temporal phase; and the second phase modulator comprises a temporal phase modulator for modulating a temporal phase of the sampled signal to compensate for the induced temporal phase In another embodiment, the first phase modulator comprises a temporal phase modulator for modulating a temporal phase of the wave signal while satisfying the Talbot condition to obtain the sampled signal, the sampled signal having an induced frequency phase; and the second phase modulator comprises a frequency phase modulator for modulating a frequency phase of the sampled signal to compensate for the induced frequency phase.

In one embodiment, the first and second phase modulators each comprise linear phase modulators.

In one embodiment, the wave signal is an optical signal.

In one embodiment, the temporal phase modulator comprises one of an electro-optic phase modulation, a cross-phase modulator, a self-phase modulator and a four-wave mixing modulator.

In one embodiment, the frequency phase modulator comprises one of a medium exhibiting second-order group velocity dispersion and a discrete spectral phase filter.

In one embodiment, the wave signal comprises of one a microwave signal, a millimeter wave signal, an x-ray wave signal, an acoustic wave signal, a thermal wave signal, a matter wave signal, an acoustic wave signal, a radio frequency wave signal and a single-photon quantum wavefunction signal.

In another embodiment, the wave signal comprises a multi-photon entangled quantum states signal.

According to another broad aspect, there is provided a method for sampling a signal, comprising: propagating a wave signal in a first phase modulator configured for modulating a phase of the wave signal while satisfying a Talbot condition, thereby obtaining a sampled signal; propagating the sampled signal into a second phase modulator configured for compensating for a given phase induced in the sampled signal by the first phase modulator while satisfying the Talbot condition, thereby obtaining a denoised and amplified sampled signal; and outputting the denoised and amplified sampled signal.

In one embodiment, said propagating the wave signal in the first phase modulator comprises propagating the wave signal in a frequency phase modulator for modulating a frequency phase of the wave signal while satisfying the Talbot condition to obtain the sampled signal, the sampled signal having an induced temporal phase; and said propagating the sampled signal in the second phase modulator comprises propagating the sampled signal in a temporal phase modulator for modulating a temporal phase of the sampled signal to compensate for the induced temporal phase In another embodiment, said propagating the wave signal in the first phase modulator comprises propagating the wave signal in a temporal phase modulator for modulating a temporal phase of the wave signal while satisfying the Talbot condition to obtain the sampled signal, the sampled signal having an induced frequency phase; and said propagating the sampled signal in the second phase modulator comprises propagating the sampled signal in a frequency phase modulator for modulating a frequency phase of the sampled signal to compensate for the induced frequency phase.

In one embodiment, the first and second phase modulators each comprise linear phase modulators.

In one embodiment, the wave signal is an optical signal.

In one embodiment, the temporal phase modulator comprises one of an electro-optic phase modulation, a cross-phase modulator, a self-phase modulator and a four-wave mixing modulator.

In one embodiment, the frequency phase modulator comprises one of a medium exhibiting second-order group velocity dispersion and a discrete spectral phase filter.

In one embodiment, the wave signal comprises of one a microwave signal, a millimeter wave signal, an x-ray wave signal, an acoustic wave signal, a thermal wave signal, a matter wave signal, an acoustic wave signal, a radio frequency wave signal and a single-photon quantum wavefunction signal.

In another embodiment, the wave signal comprises a multi-photon entangled quantum states signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present system may be seen as a lossless sampling and/or noiseless amplifying system which leads to an effective sampling and/or noise-mitigation tool, applicable in both the temporal and spectral domains, for a input wave signal having any arbitrary coherent waveform. The signal outputted by the present system is a sampled version of the input wave signal from which noise has been mitigated. The present method of sampling and noise mitigation is applicable for any wave system where basic temporal and spectral phase modulation (e.g., temporal phase modulation and spectral phase filtering) principles can be defined.

Figure 1:
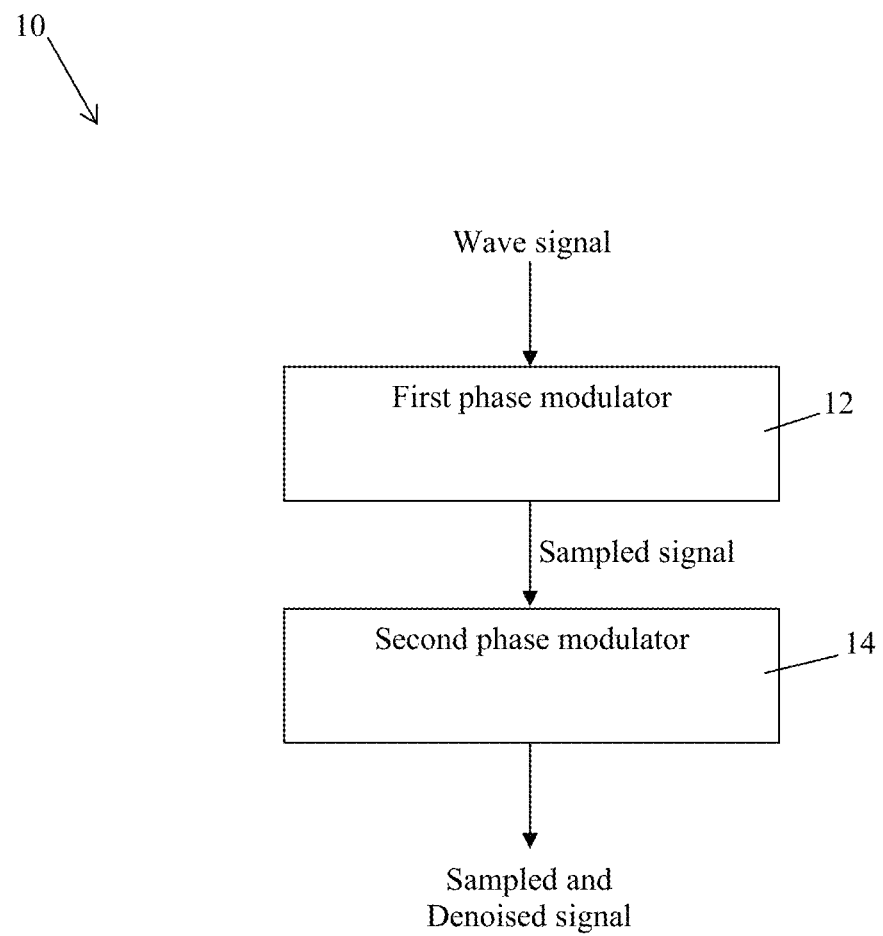
FIG. 1 is a block diagram of a system for sampling and denoising a signal, in accordance with an embodiment.

FIG. 1 illustrates one embodiment of a system 10 for sampling and denoising amplification of an input wave signal. The system 10 comprises a first phase modulator 12 and a second phase modulator 14. The first phase modulator 12 is configured for receiving the input wave signal to be denoised. The first phase modulator 12 modulates the phase of the received input wave signal while satisfying the Talbot condition. The result of the phase modulation of the input wave signal is a sampled signal which is outputted by the first phase modulator 12.

The second phase modulator 14 receives the sampled signal from the first phase modulator 12 and modulates the phase of the sampled signal so as to remove a given phase introduced into the sampled signal by the first phase modulator 12 while satisfying the Talbot condition. The result of the phase modulation of the sampled signal is a sampled and denoised signal, i.e. a sampled version of the input wave signal from which noise has been at least partially mitigated. As a result, a signal can be extracted from the samples, which corresponds to a copy of input wave signal of which the signal-to-noise ratio (SNR) has been improved.

It should be understood that both the first and second phase modulators 12 and 14 each modulate a phase while satisfying the Talbot condition. A phase profile that satisfies the Talbot condition is a phase profile that may be written as follows:

$$\phi = \sigma\pi\frac{p}{q}k^2 + \pi c, \qquad (1)$$

where q is the amplification factor, p is a free parameter co-prime with q, c is a constant (which may be ignored or set to zero for practical implementation purposes, as it only contributes a uniform phase shift), $\sigma = \pm 1$ and k indexes the phase levels. Intuitively, a phase modulation which satisfies a Talbot condition effectively takes an image and displaces it along the Talbot Carpet. Since both the first and second phase modulation each follow the form of Eq. 1, and thus, they change the periodicity of the waveform along the Talbot carpet, both satisfy Talbot conditions.

In one embodiment, the system 10 is configured for providing amplification in the frequency domain, i.e. frequency or spectral amplification. In this case, the first phase modulator 12 is a frequency phase modulator that modulates the frequency phase of the input wave signal while satisfying the Talbot condition. The resulting signal is a first sampled wave signal. During the frequency phase modulation, a temporal phase is induced in the first sampled signal and the second phase modulator 14 is designed so as to compensate for the induced temporal phase. The second phase modulator 14 is a temporal phase modulator which modulates the temporal phase of the first sampled signal while satisfying the Talbot condition so as to compensate for the temporal phase induced therein by the first phase modulator 12. The output of the temporal phase modulator is a second sampled signal which corresponds to a sampled and denoised version of the input wave signal. Such a system providing spectral amplification may be used for in-band noise mitigation.

In another embodiment, the system 10 is configured for providing amplification in the time domain, i.e. temporal amplification. In this case, the first phase modulator 12 is a temporal phase modulator that modulates the temporal phase of the input wave signal while satisfying the Talbot condition. The resulting signal is a first sampled wave signal. During the temporal phase modulation, a frequency phase is induced in the first sampled signal and the second phase modulator 14 is designed so as to compensate for the induced frequency phase. The second phase modulator 14 is a frequency phase modulator which modulates the frequency phase of the first sampled signal while satisfying the Talbot condition so as to compensate for the frequency phase induced therein by the first phase modulator 12. The output of the temporal phase modulator is a second sampled signal which corresponds to a sampled and denoised version of the input wave signal. Such a system providing temporal amplification may be used for out-of-band noise mitigation.

In one embodiment, the first phase modulator 12 and/or the second phase modulator 14 is a linear phase modulator. For example, the two phase modulator 12 and 14 may be linear phase modulators. In another example, the first phase modulator 12 may be a linear phase modulator while the second phase modulator 14 may be a non-linear phase modulator.

By a suitable combination of temporal and spectral phase modulation performed by the first and second phase modulators 12 and 14 according to the wave theory of a Talbot array illuminator (TAI), i.e. the phase modulations satisfy the Talbot condition, an input wave signal in the temporal or spectral domain can be transformed into a sampled version of the input wave signal (i.e., a collection of spaced-apart peaks following the waveform shape of the input wave signal), where each peak is obtained from redistributing the energy already carried by the input signal of interest, thereby acquiring a higher energy level than that of the original input signal's envelope at that point. In order to preserve the envelope shape of the input wave signal, the separation between the TAI peaks of the output sampled signal needs to satisfy the basic Nyquist criterion in the corresponding temporal or spectral domain. Since random (incoherent) noise is not amplified by the phase modulation processes, the background noise remains essentially unaffected while the coherent components of the input wave signal (i.e. the signal under test) are amplified over this background noise.

Figure 2:
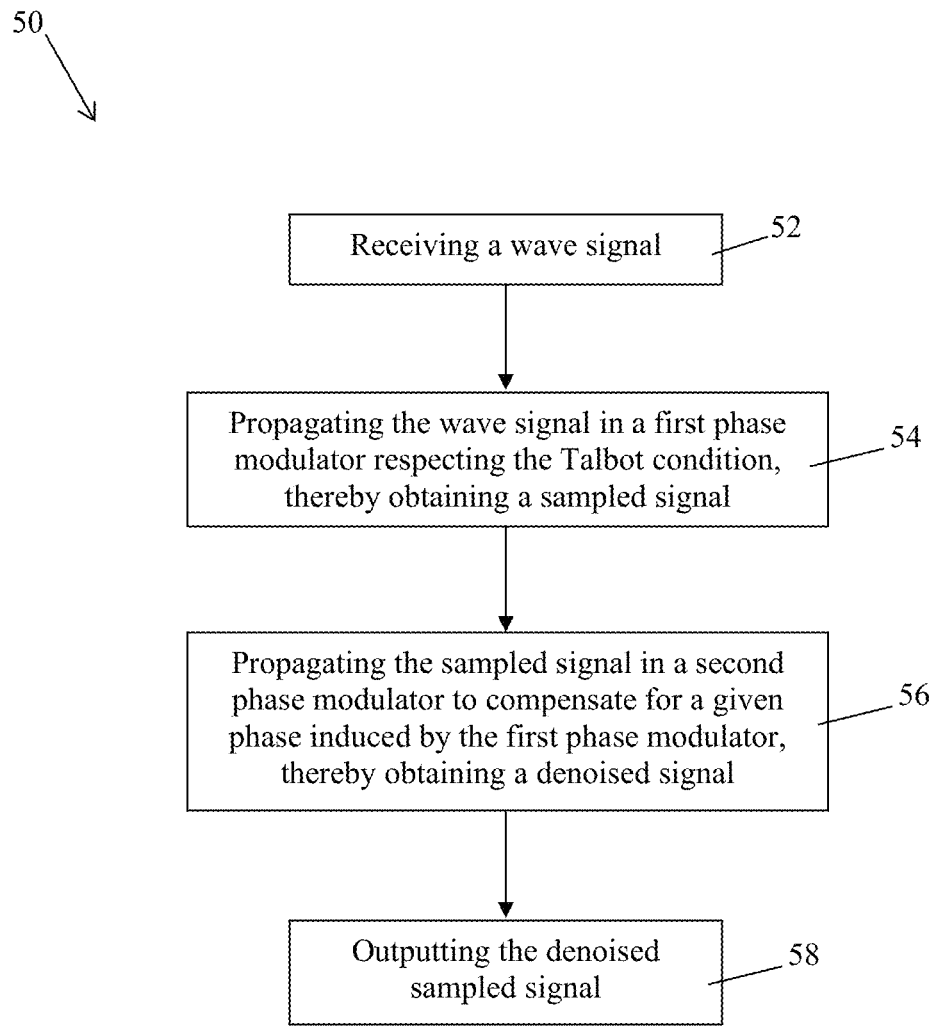
FIG. 2 is a flow chart of a method for sampling and denoising a signal, in accordance with an embodiment.

FIG. 2 illustrates one embodiment of a method 50 for sampling and denoising an input wave signal. At step 52, the input wave signal to be processed is received. It should be understood that the input wave signal comprises two signal components: a signal component corresponding to the signal of interest and a noise component. The goal of the method 50 is to create a sampled version of the input signal with higher SNR, i.e. outlining a waveform with an increase in the ratio of the power of the component of interest to the power of the noise component.

At step 54, a first phase modulation is applied to the input wave signal while satisfying the Talbot condition by propagating the input wave signal in a first phase modulator, thereby obtaining a first sampled signal. The first phase modulation of the input wave signal induces a given phase into the first sampled signal.

At step 56, a second phase modulation is applied to the first sampled signal obtained at step 54 while satisfying the Talbot condition to compensate for the given phase induced into the sampled signal during the first phase modulation. The second phase modulation is performed by propagating the sampled signal in a second and different phase modulator. The output of step 56 is a second sampled signal which corresponds to a sampled version of the input wave signal from which noise has been at least partially mitigated.

At step 58, the second sampled signal is outputted. For example, the second sampled signal may be stored in memory. In another example, the second sampled signal may be outputted for display purposes.

For temporal amplification, the step 54 consists in modulating the temporal phase of the input wave signal while satisfying the Talbot condition, for a given amplification factor, m, and associated peak separation. The step 56 consists in modulating the frequency phase of the first sampled signal while satisfying the Talbot condition for compensating for the spectral phase induced in the first sampled signal by the first modulation performed at step 54.

In an embodiment in which the input wave signal is an optical signal, a temporal phase modulation can be achieved through electro-optic phase modulation, or through nonlinear interaction, such as cross-phase modulation, self-phase modulation, four-wave mixing, or the like. A spectral phase modulation can be achieved by propagating the sampled signal through a transparent medium exhibiting second-order group velocity dispersion, by discrete spectral phase filtering (e.g., through a pulse-shaping method), or through any optical phase filter technology where the spectral phase response can be customized to satisfy the Talbot conditions.

For spectral amplification, the step 54 consists in modulating the frequency phase of the input wave signal according to the theory of the Talbot phases, for a given amplification factor, m, and associated peak separation. The step 56 consists in modulating the temporal phase of the first sampled signal while satisfying the Talbot condition for compensating for the temporal phase induced in the first sampled signal by the first modulation performed at step 54.

In an embodiment in which the input wave signal is an optical signal, the temporal phase modulators and spectral phase modulators mentioned above may be used for spectral amplification.

In one embodiment, the temporal and spectral phase modulators are both linear phase modulators to apply only linear processes to the signals. As opposed to non-linear processes, linear processes may be simple, cost-efficient, accessible and/or widely available as off-the-shelf components. When the input wave signal is an optical signal, a suitable combination of spectral phase modulations may be achieved through a dispersive medium followed by temporal phase modulation from an electro-optic phase modulator for spectral amplification for example.

In the following, two examples of sampling and denoising of optical signals are provided. The first example illustrates frequency amplification while the second example illustrates temporal amplification.

Figure 3A:
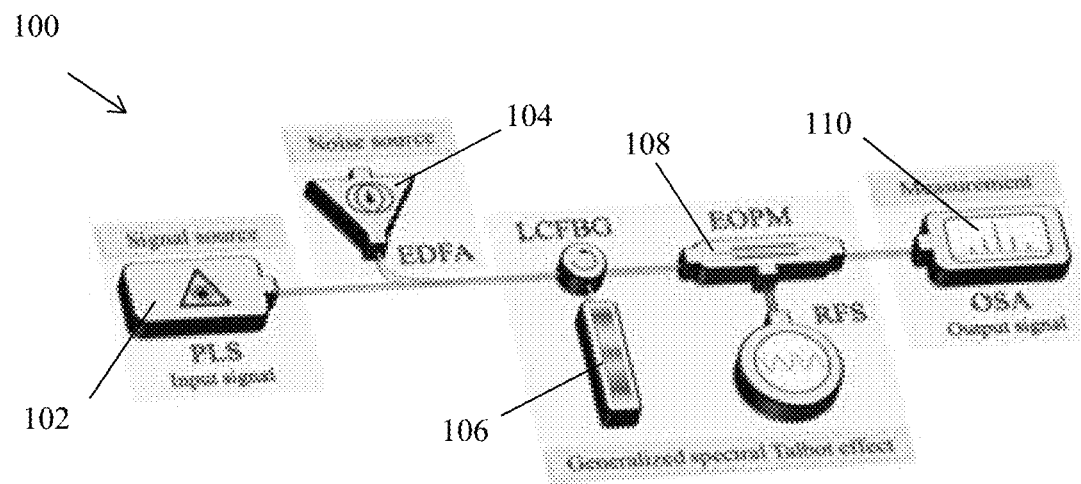
FIG. 3a illustrates an experimental setup for spectral Talbot amplification of arbitrary (non-repetitive) optical waveforms, in accordance with an embodiment.

FIG. 3a illustrates an exemplary setup 100 for experimental demonstration of frequency amplification. The optical waveform to be detected is generated by a femtosecond 250 MHz-rate pulsed laser source (PLS) 102, which is filtered using a tunable optical band-pass filter in order to vary the signal's bandwidth and central frequency. Amplified spontaneous emission (ASE) noise is then injected using a high-power erbium-doped fiber amplifier (EDFA) 104. The generated noisy signal, i.e. the input wave signal, is subsequently processed to induce a generalized spectral Talbot effect. For spectral amplification by a factor m, the input wave signal first undergoes dispersion through a frequency phase modulator, namely a linearly-chirped fiber Bragg grating (LCFBG) 106, according to the Talbot condition $2m\pi|\ddot{\phi}|v_r^2=1$, where $|\ddot{\phi}|$ is the second-order dispersion coefficient of the LCFBG, and $v_r$ represents a virtual repetition rate related to the frequency period of the amplified spectral peaks to be generated following phase modulation. The resulting sampled signal passes through a temporal phase modulator, namely an electro-optic phase modulator 108, for temporal phase modulation according to the discrete phase levels $\varphi_n$ stated above, applied with a period $v_r^{-1}$, where s is set as m−1. The output waveform is finally analyzed on an optical spectrum analyzer (OSA) 110 for example.

In one embodiment, although the ideal case calls for discrete phase levels, which requires the use of expensive and bulky RF arbitrary waveform generation equipment, for low m values the phase levels may be approximated using a sine wave generated from an RF synthesizer.

Figure 3B:
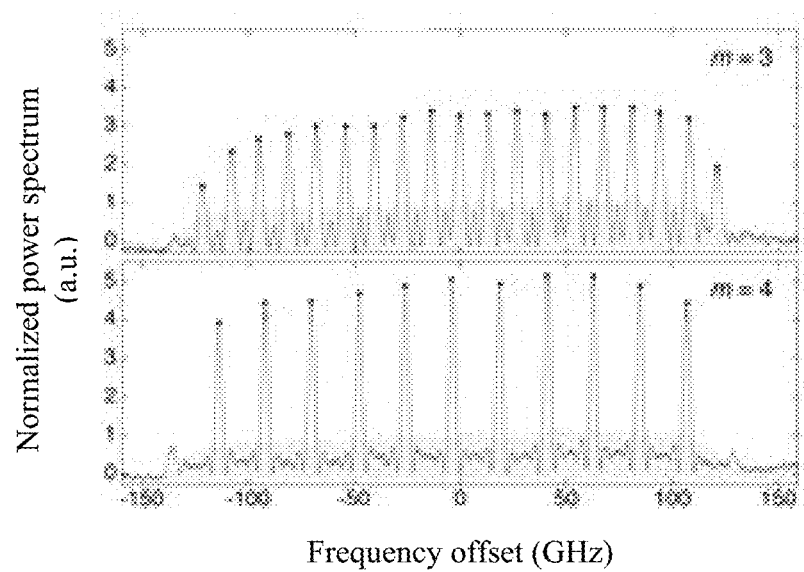
FIG. 3b illustrates an exemplary spectral Talbot amplification of a relatively low-noise broadband (~200-GHz) flat-spectrum pulsed waveform as outlined by the envelope of the spectral peaks, for m=3 and m=4, leading to a visibility increase of $\eta=3.06\pm0.15$ (m=3) and $\eta=4.89\pm0.2$ (m=4), and an improvement in the coefficient of variation $CV_T/CV_N=0.75\pm0.07$ (m=3) and $CV_T/CV_N=0.57\pm0.08$ (m=4), with the power units being shown on a linear scale, normalized to the average value of the input spectrum.
Figures 4A, 4B, 4C:
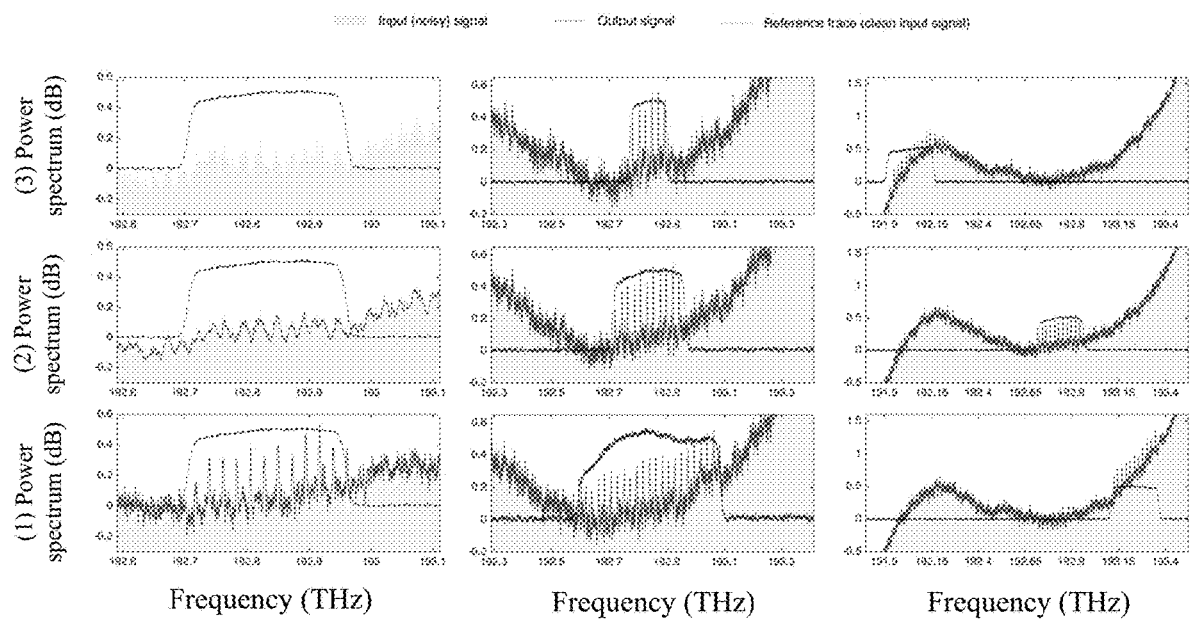
FIG. 4a illustrates an exemplary initial noisy signal (1), the noisy signal remaining undetectable after OSA averaging of 25 copies (2), and the detected underlying signal (3)
FIG. 4b illustrates the exemplary underlying signal of FIG. 4a when detected for varying bandwidth of (1) 126.7 GHz, (2) 244.3 GHz, and (3) 493 GHz.
FIG. 4c illustrates the exemplary underlying signal of FIG. 4a when detected with varying central frequency (1) 192.0 THz, (2) 192.8 THz and (3) 193.2 THz.

In the experiments, the noise floor level is set to 0 in order to quantify the amplification relative to the power of the noisy signal. To assess the performance of the present method, the mean and standard deviation are calculated from points in the vicinity of each frequency peak, for both the original and processed signal. Defining the visibility ratio, η, as the mean value of the output divided by the mean value of the input waveform, FIG. 4b shows the anticipated increase in power according to the m factor. The noise level may be quantified by the coefficient of variation (CV), defined as the standard deviation divided by the mean. The ratio of the Talbot-processed signal, $CV_T$, to the noisy signal $CV_N$ reported in FIG. 3b indicates denoising of the original signal.

In some embodiments, the present method is generally able to detect signals simply not detectable by conventional averaging as shown in FIG. 4b. Here the noisy signal in FIG. 4a.1 remains undetected after an OSA averaging of 25 copies, while the present Talbot processor reveals the underlying signal on-the-fly. Using the present method and system, no a priori knowledge of the signal is required to recover the desired information. Using the Talbot condition m=4, FIGS. 4b and 4c show successful detection of pulsed waveforms of varying bandwidth and central frequency, entirely buried under noise, using the exact same set-up and Talbot condition.

Figure 5:
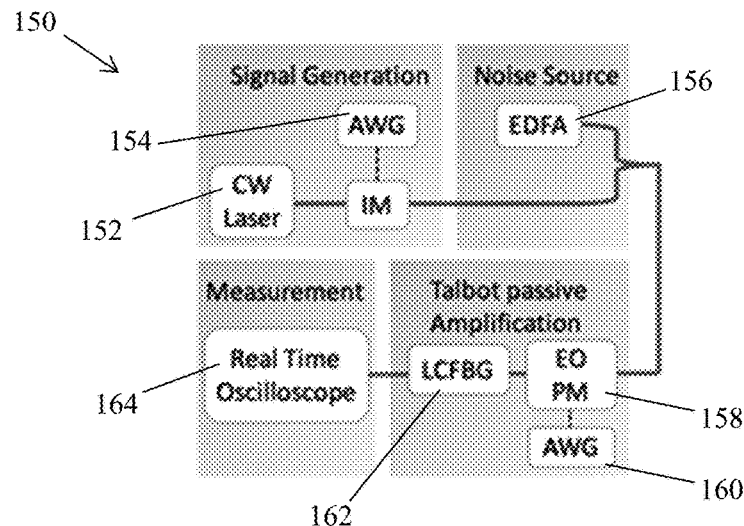
FIG. 5 illustrates an experimental set-up for temporal Talbot amplification of arbitrary (non-repetitive) optical waveforms, in accordance with an embodiment.
Figure 6:
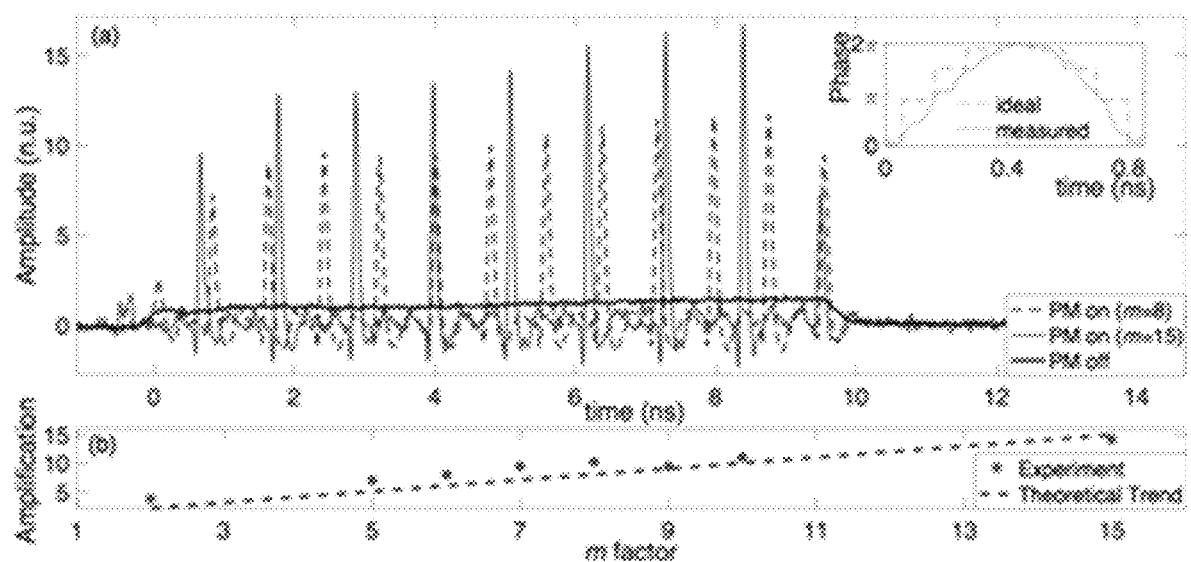
FIG. 6a illustrates exemplary temporal amplification by factors of 10.1 and 14.1, with associated equivalent sampling rates of 1.26 and 0.9 GHz (designed value of Tr=1.25 and 0.9 GHz, corresponding to m=8 and 15, respectively), with the he inset showing a detail of the applied temporal Talbot phase modulation sequences, for m=8.
FIG. 6b illustrates the amplification factors measured at FIG. 6a and the theoretically predicted trend, in accordance with an embodiment.

FIG. 5 illustrates an exemplary setup 150 for experimental demonstration of temporal amplification. The input signal is generated by intensity modulation (IM) of a continuous wave (CW) laser 152 (at 1550.2 nm), driven by a low-speed arbitrary waveform generator (AWG) 154. ASE noise may then be introduced in the signal for noise mitigation experiment via a high-power EDFA 156. This input wave signal then travels through a temporal phase modulator, namely an electro-optic phase modulator (PM) 158, driven by a 7.5 GHz AWG 160, which applies the required temporal Talbot phases, i.e., $\varphi=\pi n^2 (m-1)/m$, where n labels the consecutive phase levels. These phases are m periodic in n, with temporal period Tr, as depicted in the inset of FIG. 6a. The resulting phase-modulated signal then enters a frequency phase modulator, namely a dispersive medium satisfying the condition $2\pi\ddot{\phi}_2=mT_r^2$. In the present case, this is implemented using a linearly-chirped fiber Bragg grating 162 with a dispersion of ~10,000 ps/nm. This procedure effectively focuses the input signal energy within bins of width Tr/m at a repetition rate of 1/Tr. The temporal traces are recorded with a 28-GHz bandwidth real-time oscilloscope 164 (with no averaging).

The amplification of a 10-ns long square wave is shown in FIG. 6b.1, for amplification factors of 10.1 and 14.1 and sampling rates of 1.26 GHz and 0.9 GHz respectively. FIG. 6b.2 shows that the measured trend in the amplification factors follows the theoretical predictions, up to a factor m of ~15, only limited by the bandwidth of the AWG.

Figure 7:
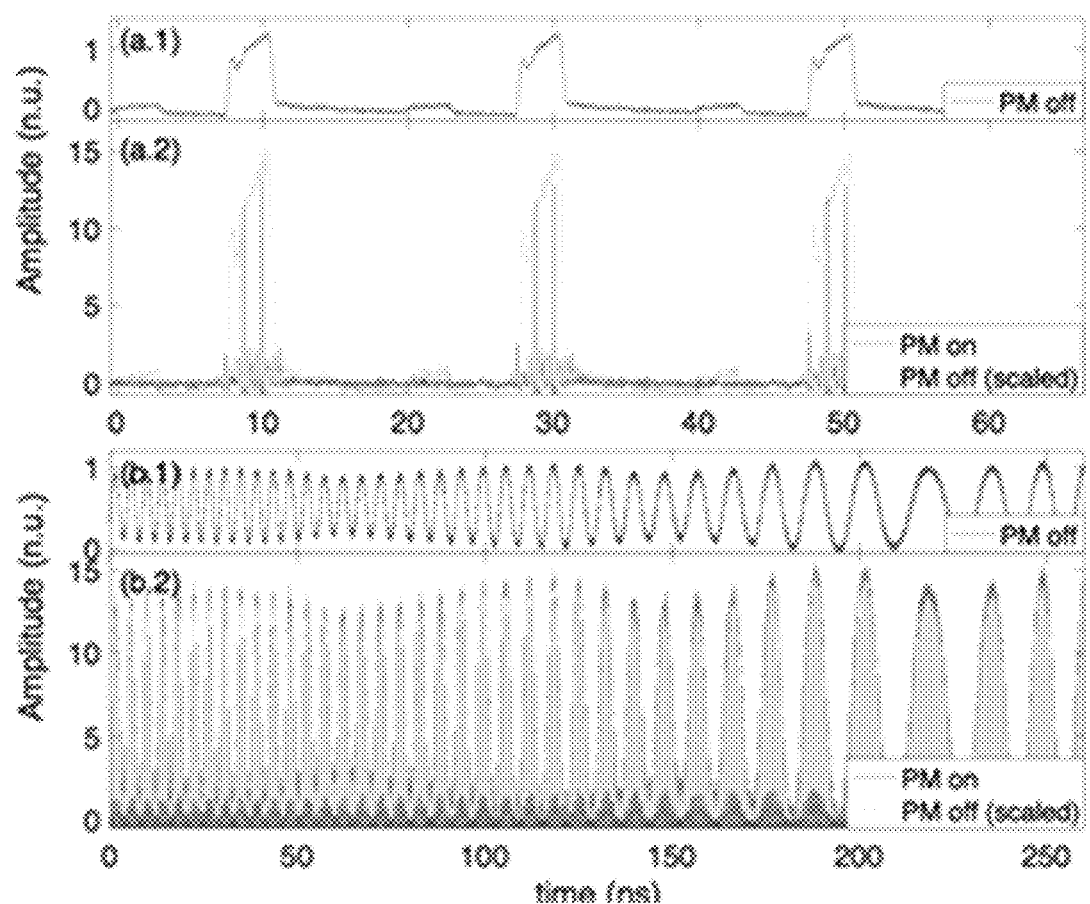
FIGS. 7a and 7b illustrate exemplary passive temporal amplification of a pulsed waveform repeating at 50 MHz and a 50-to-250 MHz chirped sinusoidal waveform, respectively, with amplification factors of 12 and 14.1, respectively. In each case, the measured signals without phase modulation (PM off) are shown on top, normalized to an amplitude of 1. Below them, we show the amplitudes for the measured signals with phase modulation (PM on), where the traces are normalized relative to the input signal peak value, along with the initial signal scaled by the measured amplification factor.
Figure 8:
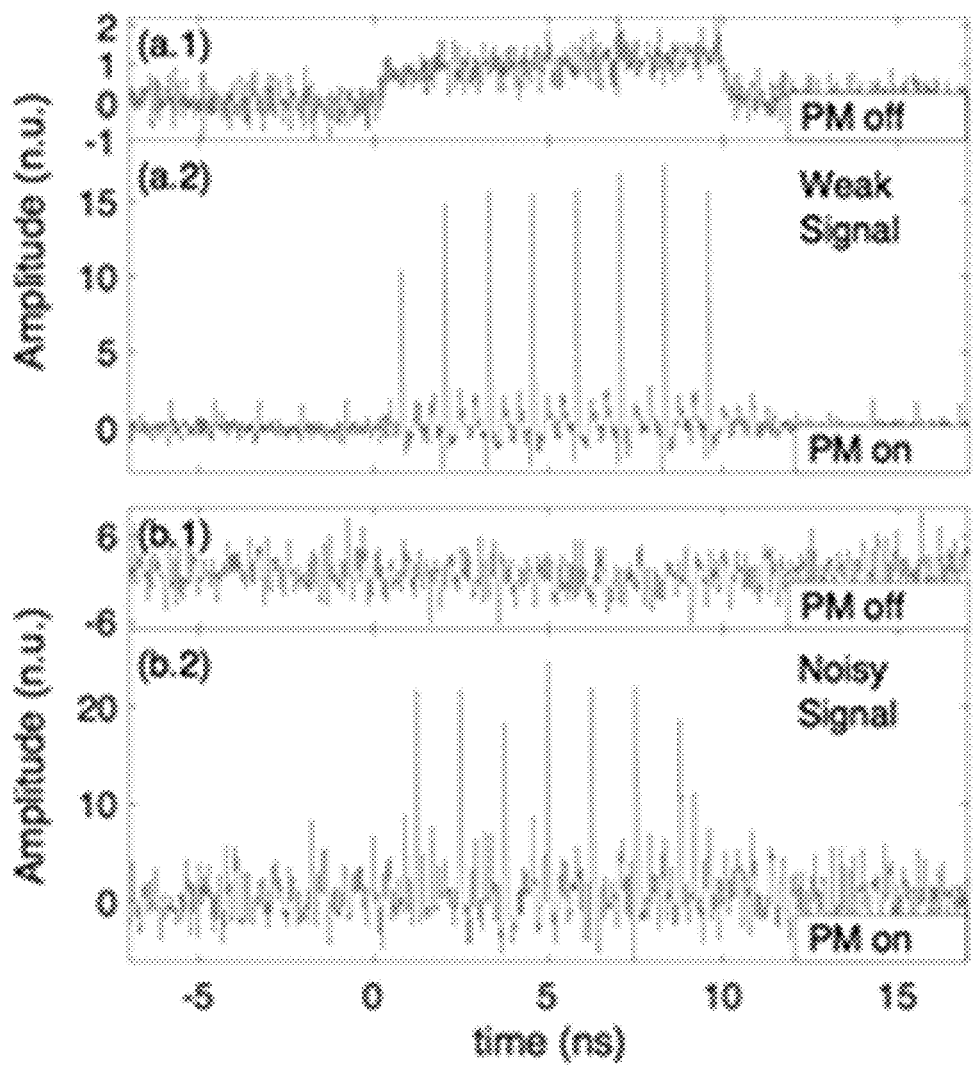
FIGS. 8a.1 and 8a.2 illustrate a weak 10-ns pulse (−11.34 dBm) passively amplified by a factor of ~15 and FIGS. 8b.1 and 8b.2 illustrate the weak signal when 12.5 dBm of ASE (5 nm bandwidth) is injected in order to bury the signal under noise. The set-up of FIG. 5 extracts the signal from the noise background with FIGS. 8a.1 and 8b.1 corresponding to the output without phase modulation (PM off) while FIGS. 8a.2 and 8b.2 show the output with phase modulation (PM on)

In one embodiment, the system of FIG. 5 is well-suited for signals with a short duty cycle (e.g., a clock signal), as well as for non-repetitive signals, (e.g., a chirped sinusoidal waveform), as shown through the two representative examples reported in FIG. 7. FIG. 8 shows results on the recovery of a weak 10-ns long square wave signal entirely buried in noise, demonstrating the denoising capabilities of this passive amplifier.

It should be understood that the experimental set-up 150 of FIG. 5 is exemplary only. For example, the signal driving the phase modulator could be a single RF tone, which would allow for higher sampling rates, at the cost of lower amplification factors.

Furthermore, the present set-up 150 does not require any a priori knowledge on the central wavelength of the incoming signals, as long as the signal spectrum is within the operation bandwidth of the dispersive medium used for Talbot amplification.

While in the above description, reference is made to the sampling and denoising of optical wave signals, it should be understood that the present method is not limited to optical waveforms: The present method may be applied to any wave-phenomenon for which corresponding temporal and spectral phase modulation processes are available, including most frequency regions of the electromagnetic spectrum, such as microwave signals, radio frequency (RF) signals and potentially other wave platforms, such as acoustic of matter waves. The above described method may also be used for sampling and denoising millimeter wave signals, thermal wave signals, single-photon quantum wavefunctions, multi-photon entangled quantum states signals and x-ray regime signals.

In one embodiment, the above-described method and system may be applied on single-photons either in the temporal or spectral domain.

Figure 9A:
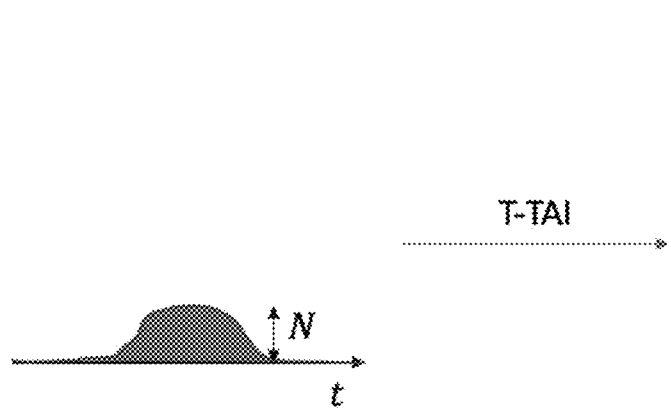
FIG. 9a shows an exemplary waveform extracted from a histogram of the arrival times of a collection of single-photons, outlining the wavefunction of the single-photons with a given shape, time width and peak counts.

When a single photon source operates at a given frequency rate f, e.g. at a kHz rate, a given number of single-photons are captured after a given amount of time $t_{int}$, thereby allowing for the reconstruction of the wavefunction, where the peak corresponds to N single-photons counts. FIG. 9a shows a typical waveform extracted from the histogram of the arrival times of a collection of single photons, outlining the wavefunction of these photons with a given shape, time width and peak counts. In the case of single-photons the height of a waveform is characterized with the number of single-photons that have been detected within a certain time duration. Therefore, to reconstruct a given wavefunction, a large number of single-photon events need to be detected. Considering that a single-photon source often operates at relatively low rates, large integration times on the order of several hours may be required in order to reconstruct a wavefunction.

Figure 9B:
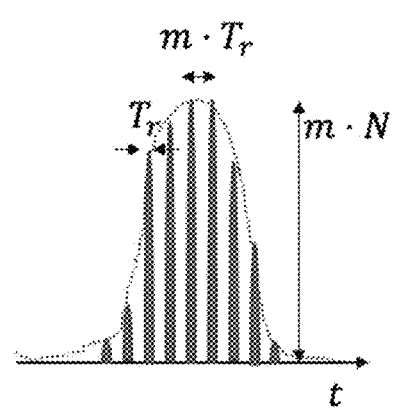
FIG. 9b shows the effect of the application of the method of FIG. 2 on the waveform of FIG. 9a, in which the peak counts are focused to arrive within specific time regions only.

The present method and system allow for reducing the time required for reconstructing a wavefunction. In this case, the above-described TAI process focuses the probability wavefunction into a series of peaks; i.e., instead of detecting single-photon events along the whole duration of the wavefunction, the counts are focused to arrive within specific time regions/windows only due to the TAI process, as illustrated in FIG. 9b. Therefore, for a same integration time $t_{int}$, the detected wavefunction now has a peak corresponding to a maximum number of counts mN.

In one embodiment, the above-described method and system are used for reducing the integration time of experiments. In this case, instead of keeping the integration time $t_{int}$ constant, one may aim for the peak of the wavefunction to have the same number of counts. Therefore, if without the TAI process, the wavefunction has a peak number of counts N during a time $t_{int}$, then when the TAI process is applied, the same number of counts N will be reached within a time $t_{int}/m$. Considering that certain experiments require hours of integration, this could be a valued advantage.

In the same or another embodiment, the TAI process allows for the detection of single-photon wavefunctions that would otherwise be lower than the efficiency of the detectors.

In an embodiment in which the above-described method and system are used for multi-photon entangled quantum states signals, the entanglement between photons is preserved so that the above-described method and system may be used to detect entangled photon pairs.

Temporal phase modulation can be defined as a shift of the relative phase between a carrier signal and its envelope. By creating a signal composed of discrete steps according to the theory of Talbot phases, the temporal phase modulation can be applied by linear or non-linear methods. A particularly convenient method is to use an electro-optic phase modulator, which is a linear device. This is very common in the optical domain and similar temporal phase modulation technologies are available in the microwave domain and in millimeter waves, amongst others. Alternatively, the temporal phase modulation can be applied in a non-linear fashion using, for example, cross-phase modulation or four-wave mixing. These processes are also available in the microwave regime.

Quadratic Spectral phase modulation is equivalent to inducing a linear group delay as a function of frequency. This operation occurs naturally when an electromagnetic wave propagates through most materials, since the refractive index always depends on frequency to some extent. This effectively leads different frequency components of a wave to travel at different velocities, inducing a spectral phase variation. The phase variation can also be applied using specially-engineered resonant structures and devices, such as linearly-chirped fiber Bragg gratings. Such structures have been developed in optics, in the microwave domain and for millimeter waves. Alternatively, this quadratic spectral phase modulation can be done discretely, by means of discrete spectral phase modulation, routinely implemented by pulse-shaping techniques.

In one embodiment, the above-described method may be used for amplifying weak signals through a fundamentally noiseless process and signals may be amplified in either the spectral or temporal domain while using the same equipment (though with fundamental differences in the way the involved steps are combined together and designed).

In one embodiment, the temporal and frequency phase modulation is achieved using purely linear processes, such as group velocity dispersion and electro-optic temporal phase modulation. Such linear processes are simple to use in a practical design, as they can be implemented through widely-available components at relatively low-costs.

In one embodiment the present method is applicable to a wide variety of wave systems where the needed temporal and spectral phase modulation processes are available. In particular, this includes waveforms across most of the electromagnetic spectrum.

In one embodiment, the bandwidth and central frequency of the signal do not need to be known beforehand, nor the exact temporal occurrence of the signal.

In one embodiment, amplification is possible for arbitrarily shaped signals. In order to preserve the envelope shape of the signal, the frequency of the output peaks needs to satisfy the basic Nyquist criteria in the corresponding domain. However, if one simply wants to detect the presence of a signal (without extracting the specific envelope), satisfying the basic Nyquist criteria is not necessary.

In one embodiment, the present method for noiseless amplification in the frequency domain produces an effective in-band noise mitigation effect. This may be important since methods for in-band noise mitigation are very scarce, complex, case-specific, and of very limited use.

In one embodiment and in both the temporal and spectral domains, it is possible to extract a signal which is completely buried under a noise background (i.e., a signal weaker than the noise floor), otherwise impossible or very difficult to detect through conventional amplification methods.

In one embodiment, the present method allows for arbitrarily high amplification, only limited by the available components that can perform the phase modulation processes.

The embodiments of the invention described above are intended to be exemplary only. The scope of the invention is therefore intended to be limited solely by the scope of the appended claims.

We claim:

1. A system for sampling a signal, comprising:
a first phase modulator configured for receiving a wave signal and modulating a phase of the wave signal while satisfying a Talbot condition to obtain a sampled signal; and
a second phase modulator configured for receiving the sampled signal, compensating for a given phase induced in the sampled signal by the first phase modulator while satisfying the Talbot condition to obtain a denoised and amplified sampled signal, and outputting the denoised and amplified sampled signal
wherein:
the first phase modulator comprises a frequency phase modulator for modulating a frequency phase of the wave signal while satisfying the Talbot condition to obtain the sampled signal, the sampled signal having an induced temporal phase, and the second phase modulator comprises a temporal phase modulator for modulating a temporal phase of the sampled signal to compensate for the induced temporal phase; or
the first phase modulator comprises a temporal phase modulator for modulating a temporal phase of the wave signal while satisfying the Talbot condition to obtain the sampled signal, the sampled signal having an induced frequency phase, and the second phase modulator comprises a frequency phase modulator for modulating a frequency phase of the sampled signal to compensate for the induced frequency phase.

2. The system of claim 1, wherein the first and second phase modulators both comprise linear phase modulators.

3. The system of claim 1, wherein the wave signal is an optical signal.

4. The system of claim 3, wherein the temporal phase modulator comprises one of an electro-optic phase modulation, a cross-phase modulator, a self-phase modulator and a four-wave mixing modulator.

5. The system of claim 3, wherein the frequency phase modulator comprises one of a medium exhibiting second-order group velocity dispersion and a discrete spectral phase filter.

6. The system of claim 1, wherein the wave signal comprises of one a microwave signal, a millimeter wave signal, an x-ray wave signal, an acoustic wave signal, a thermal wave signal, a matter wave signal, an acoustic wave signal, a radio frequency wave signal and a single-photon quantum wavefunction signal.

7. The system of claim 1, wherein the wave signal comprises a multi-photon entangled quantum states signal.

8. A method for sampling a signal, comprising:
propagating a wave signal in a first phase modulator configured for modulating a phase of the wave signal while satisfying a Talbot condition, thereby obtaining a sampled signal;
propagating the sampled signal into a second phase modulator configured for compensating for a given phase induced in the sampled signal by the first phase modulator while satisfying the Talbot condition, thereby obtaining a denoised and amplified sampled signal; and
outputting the denoised and amplified sampled signal,
wherein:
said propagating the wave signal in the first phase modulator comprises propagating the wave signal in a frequency phase modulator for modulating a frequency phase of the wave signal while satisfying the Talbot condition to obtain the sampled signal, the sampled signal having an induced temporal phase, and said propagating the sampled signal in the second phase modulator comprises propagating the sampled signal in a temporal phase modulator for modulating a temporal phase of the sampled signal to compensate for the induced temporal phase, or
said propagating the wave signal in the first phase modulator comprises propagating the wave signal in a temporal phase modulator for modulating a temporal phase of the wave signal while satisfying the Talbot condition to obtain the sampled signal, the sampled signal having an induced frequency phase, and said propagating the sampled signal in the second phase modulator comprises propagating the sampled signal in a frequency phase modulator for modulating a frequency phase of the sampled signal to compensate for the induced frequency phase.

9. The method of claim 8, wherein the first and second phase modulators both comprise linear phase modulators.

10. The method of claim 8, wherein the wave signal is an optical signal.

11. The method of claim 10, wherein the temporal phase modulator comprises one of an electro-optic phase modulation, a cross-phase modulator, a self-phase modulator and a four-wave mixing modulator.

12. The method of claim 10, wherein the frequency phase modulator comprises one of a medium exhibiting second-order group velocity dispersion and a discrete spectral phase filter.

13. The method of claim 8, wherein the wave signal comprises of one a microwave signal, a millimeter wave signal, an x-ray wave signal, an acoustic wave signal, a thermal wave signal, a matter wave signal, an acoustic wave signal, a radio frequency wave signal and a single-photon quantum wavefunction signal.

14. The method of claim 8, wherein the wave signal comprises a multi-photon entangled quantum states signal.

* * * * *